United States Patent
Levene et al.

(10) Patent No.: US 8,586,933 B2
(45) Date of Patent: Nov. 19, 2013

(54) RADIATION DETECTOR HAVING A SPLIT LAMINATE OPTICAL COUPLING

(75) Inventors: Simha Levene, D. N. Hanegev (IL); Gerardus F. C. M. Lijten, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 473 days.

(21) Appl. No.: 12/597,182

(22) PCT Filed: Mar. 28, 2008

(86) PCT No.: PCT/IB2008/051174
§ 371 (c)(1),
(2), (4) Date: Oct. 23, 2009

(87) PCT Pub. No.: WO2008/132634
PCT Pub. Date: Nov. 6, 2008

(65) Prior Publication Data
US 2010/0116995 A1 May 13, 2010

Related U.S. Application Data

(60) Provisional application No. 60/913,829, filed on Apr. 25, 2007.

(51) Int. Cl.
*G01T 1/20* (2006.01)
(52) U.S. Cl.
USPC ...... 250/366; 250/367; 250/368; 250/370.09; 250/370.11
(58) Field of Classification Search
USPC ............... 250/366, 367, 368, 370.09, 370.11
See application file for complete search history.

(56) References Cited

U.S. PATENT DOCUMENTS

| | | | |
|---|---|---|---|
| 4,982,096 A | | 1/1991 | Fujii et al. |
| 5,132,539 A | * | 7/1992 | Kwasnick et al. ........ 250/361 R |
| 5,430,298 A | | 7/1995 | Possin |
| 6,111,257 A | * | 8/2000 | Shand et al. .................. 250/368 |
| 6,172,371 B1 | * | 1/2001 | DeJule et al. ............ 250/370.11 |
| 6,510,195 B1 | * | 1/2003 | Chappo et al. .................. 378/19 |
| 6,528,796 B1 | * | 3/2003 | Kaifu et al. .............. 250/370.11 |
| 6,947,517 B2 | | 9/2005 | Hoffman |
| 7,019,297 B2 | * | 3/2006 | Aykac et al. .................. 250/368 |
| 7,099,429 B2 | | 8/2006 | Hoffman et al. |
| 7,173,998 B2 | | 2/2007 | Hoffman et al. |

(Continued)

FOREIGN PATENT DOCUMENTS

| | | |
|---|---|---|
| JP | 01191085 A | 8/1989 |
| JP | 06160538 A | 6/1994 |
| JP | 11174156 A2 | 7/1999 |

OTHER PUBLICATIONS

JP06-160538 translation.*

(Continued)

*Primary Examiner* — David Porta
*Assistant Examiner* — Djura Malevic

(57) ABSTRACT

A radiation-sensitive detector (120) includes a scintillator array (124) coupled with a photosensor array (140) via an adhesive laminate (144). The photosensor (140) has a plurality of dixels (136). The adhesive laminate (144) includes a material free region that extends through the adhesive laminate (144) from the scintillator array (124) to the photosensor array (140) and that is located between a pair of adjacent dixels (136).

25 Claims, 3 Drawing Sheets

(56) References Cited

U.S. PATENT DOCUMENTS

| | | | |
|---|---|---|---|
| 7,692,156 B1* | 4/2010 | Nagarkar | 250/370.11 |
| 7,815,854 B2* | 10/2010 | Cohen | 422/423 |
| 2002/0070343 A1 | 6/2002 | Hoffman | |
| 2005/0244952 A1* | 11/2005 | Cohen | 435/287.2 |
| 2006/0019265 A1* | 1/2006 | Song et al. | 435/6 |
| 2007/0121113 A1* | 5/2007 | Cohen et al. | 356/432 |
| 2008/0063138 A1* | 3/2008 | Levene et al. | 378/19 |
| 2008/0206917 A1 | 8/2008 | Dast | |
| 2009/0261259 A1* | 10/2009 | Yip | 250/370.09 |

OTHER PUBLICATIONS

Adhesives Research, Inc., 2006, Insight Adhesive Research, Product Information, ARclear8154.*

* cited by examiner

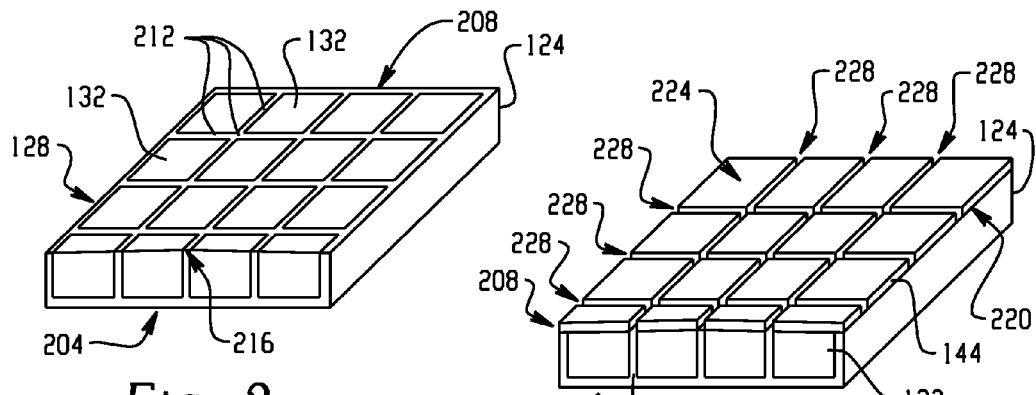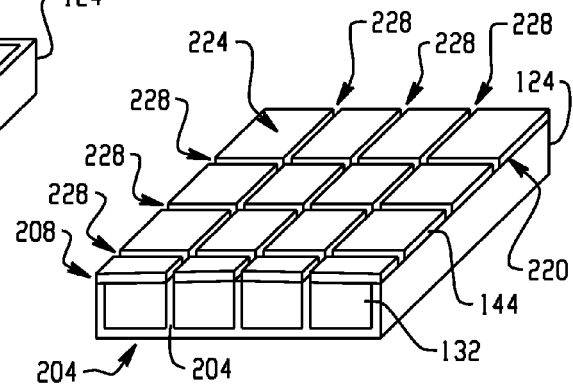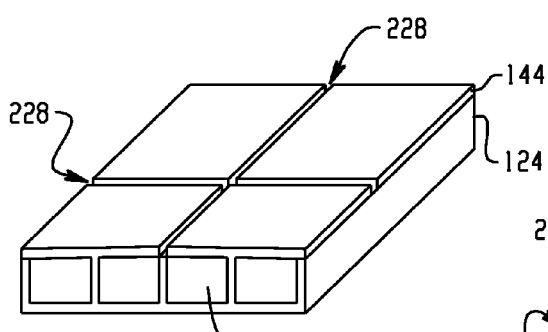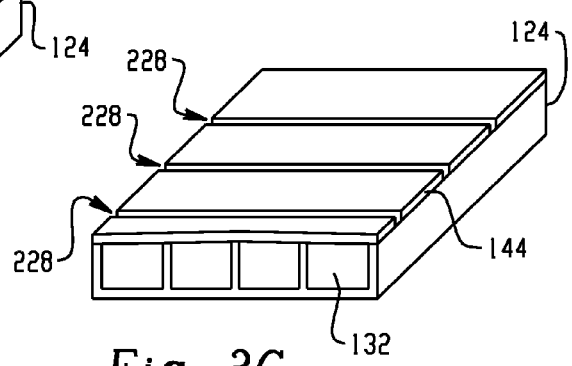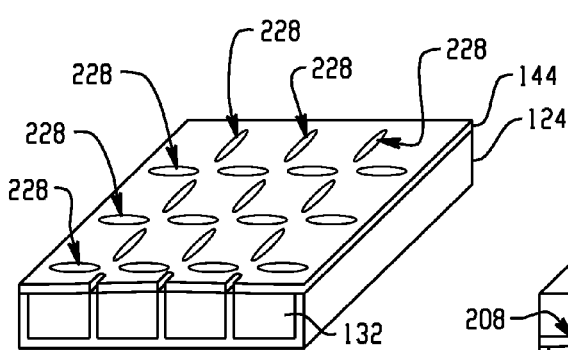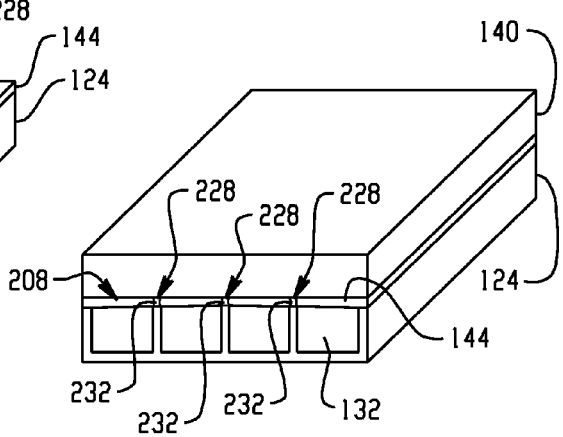

RADIATION DETECTOR HAVING A SPLIT LAMINATE OPTICAL COUPLING

CROSS REFERENCE TO RELATED APPLICATIONS

This application claims the benefit of U.S. provisional application Ser. No. 60/913,829 filed Apr. 25, 2007, which is incorporated herein by reference.

The present application generally relates to radiation-sensitive detectors. While it is described with particular application to a computer tomography (CT) system, it also relates to other applications in which it is desirable to detect radiation and generate a signal indicative thereof.

A computed tomography (CT) system has included a source of ionizing radiation that rotates about and emits radiation that traverses an examination region and a radiation-sensitive detector that receives the radiation that traverses the examination region. Such a detector has included a two-dimensional photosensor array having a plurality of rows and columns of photosensor dixels (detector elements) correspondingly optically and physically coupled to a two-dimensional scintillator array having a plurality of rows and columns of scintillator pixels. The scintillator pixels receive the ionizing radiation and produce light indicative thereof. The light traverses the coupling and is received by the corresponding photosensor dixels, which produce electrical signals indicative thereof. The signals are reconstructed to generate volumetric image data indicative of the examination region.

The material used to couple the scintillator and the photosensor arrays has included an optical coupling material, usually an epoxy, applied as a liquid glue and afterwards cured to form a solid adhesive. A technique for constructing a detector using a liquid epoxy has included securing the scintillator array in place, applying (via painting, brushing or capillary underfilling) the optical liquid epoxy to a surface of the scintillator array, installing the photosensor array on the liquid epoxy so that the liquid epoxy is disposed between the scintillator array and the photosensor array, and curing the optical liquid epoxy in situ.

Unfortunately, the surfaces of the scintillator and photosensor arrays that are in physical contact with the epoxy may include non-uniformities and irregularities. As a result, air pockets and/or gaps may exist in the region between the photosensor and the scintillator arrays, and the thickness of the adhesive may not be uniform. As a consequence, artifact may be introduced into the volumetric image data. In addition, variations in thickness of the adhesive layer may give rise to variations in the cross-talk between dixels, complicating the compensation thereof. Moreover, mixing, de-aeration, dispensing, and pre-curing of the liquid glue so that the detector array may be withdrawn from the curing jig has been a relatively lengthy manual process, accompanied by cleaning excess material.

Aspects of the present application address the above-referenced matters and others.

According to one aspect, a radiation-sensitive detector includes a scintillator array coupled to a photosensor array having a plurality of dixels via an adhesive laminate. The adhesive laminate includes a material free region that extends through the adhesive laminate from the scintillator array to the photosensor array and that is located between a pair of adjacent dixels.

In another aspect, a radiation-sensitive detector having a photosensor array coupled, via an adhesive laminate, to a scintillator array is formed by the steps of: attaching a first adhesive surface of the adhesive laminate to one of the photosensor array or the scintillator array, forming one or more material free regions through the adhesive laminate in a direction towards the photosensor array or the scintillator array, and attaching a second adhesive surface of the adhesive laminate to the other one of the photosensor array or the scintillator array. The adhesive laminate is disposed between and optically couples the photosensor dixels and the respective scintillator dixels.

In another aspect, a method includes attaching an adhesive laminate to one of a photosensor array having more than one dixel or a scintillator array. The method further includes forming a material free region in the adhesive laminate in a direction towards the photosensor array or the scintillator array. The material free region extends through the adhesive laminate. The method further includes attaching the adhesive laminate to the other one of the photosensor array or the scintillator array.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 2 illustrates a scintillator array.

FIGS. 3A, 3B, 3C, and 3D illustrates the scintillator array with an adhesive laminate installed thereon.

FIG. 4 illustrates the scintillator array and the adhesive laminate with a photosensor array installed on the adhesive laminate.

Figure 5:
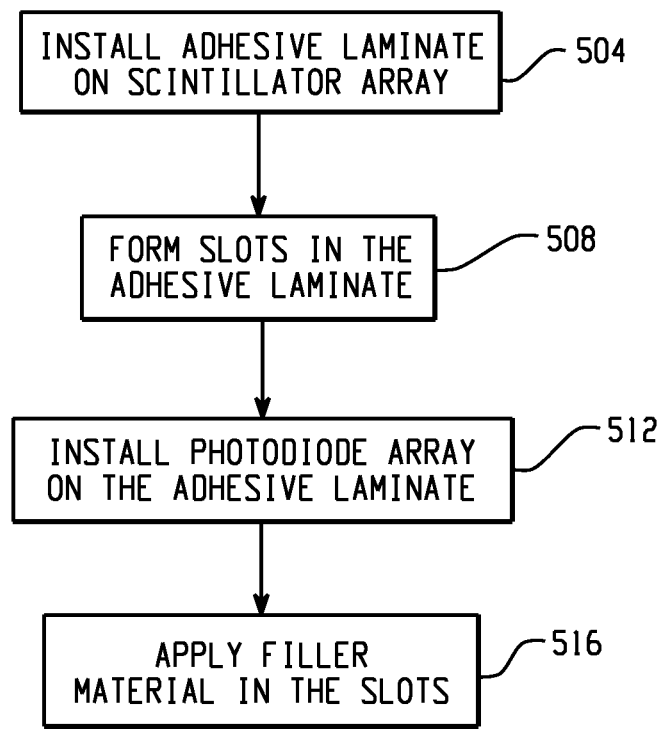

FIG. 5 illustrates a method for forming a detector array.

Figure 1:
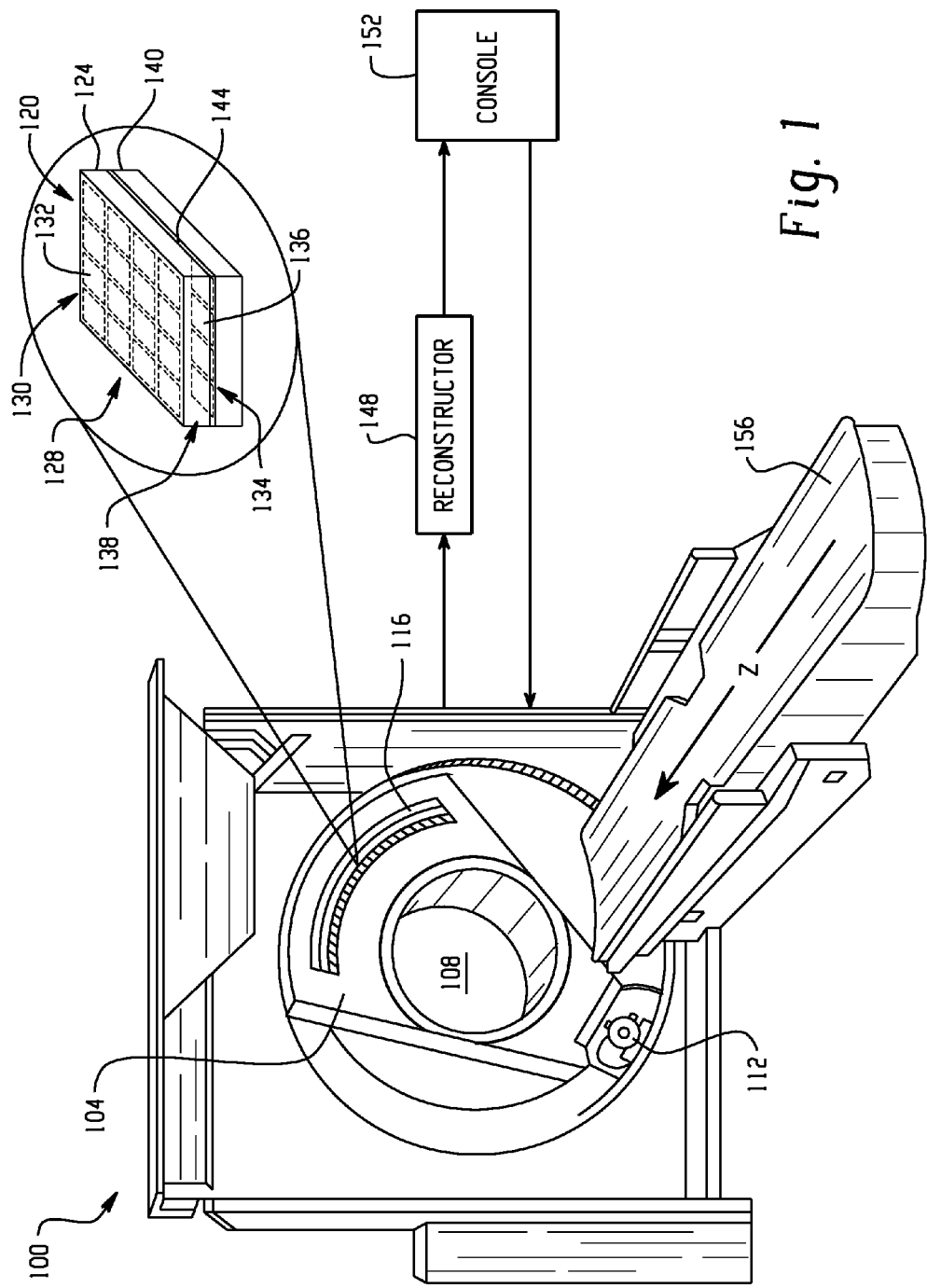
FIG. 1 illustrates an exemplary imaging system.

With reference to FIG. 1, a computed tomography (CT) system 100 includes a rotating gantry portion 104 which rotates about an examination region 108 around a longitudinal or z-axis. The rotating gantry portion 104 supports an x-ray source 112, such as an x-ray tube, that generates and emits radiation that traverses the examination region 108.

A radiation-sensitive detector array 116 receives radiation emitted by the source 112 for a plurality of projection angles or views so that projections are obtained over at least one hundred and eighty (180) degrees plus a fan angle. The detector array 116 generates a signal or projection data indicative of the detected radiation.

The illustrated detector array 116 includes a two-dimensional detector 120 having a scintillator array 124 with a plurality of rows 128 and columns 130 of scintillator pixels 132 that are coupled with corresponding rows 134 and columns 138 of dixels 136 of a photosensor array 140 via a pressure-sensitive adhesive laminate 144. The emitted radiation is received by the scintillator pixels 132, which produce light indicative thereof that traverses that adhesive laminate 144 and is received by the dixels 136. The dixels 136, which may be photodiodes, photoelements, or the like, each produce a signal indicative of the light received from a corresponding scintillator pixel 132.

For sake of brevity and clarity, the scintillator 124 is shown as having four (4) rows and four (4) columns of scintillator pixels 132, and the illustrated row of dixels 136 includes four (4) dixels 136. However, the detector 120 may include scintillator and photosensor arrays with other numbers of scintillator pixels and dixels. For example, the detector 120 may include scintillator and photosensor arrays with sixteen (16) rows of sixteen (16) pixels and dixels, respectively, rendering a detector array with two-hundred and fifty-six (256) scintillator pixel/dixel pairs. In another example, the scintillator array may include one scintillator pixel, whereas the photosensor array may include one or more dixels.

As briefly noted above, the adhesive laminate 144 is used to couple the x-ray scintillator pixels 132 and the dixels 136. The adhesive laminate 144 includes an optically conductive, double-sided adhesive laminate or gel that includes one or more material free regions such as one or more slots, holes, and/or other material free regions as described in greater detail below. In one implementation, the material free regions are configured so that the adhesive laminate 144 can deform to conform more closely to the shape of the surfaces of the x-ray scintillator array 124 and the photosensor array 140.

A reconstructor 148 reconstructs the projection data generated by the detector 116 to generate volumetric image data. The volumetric image data is indicative of objects within the examination region 108.

A general-purpose computer serves as an operator console 152. The console 152 includes a human readable output device such as a monitor or display and an input device such as a keyboard and mouse. Software resident on the console allows the operator to control and interact with the scanner 100, for example, through a graphical user interface (GUI).

An object support 156 such as a couch supports a patient or other object in the examination region 108. The object support 156 is movable so as to guide the object within respect to the examination region 108 while performing a scanning procedure.

As noted above, the detector 120 includes the scintillator array 124 and the photosensor array 140, which are optically and physically coupled together via the adhesive laminate 144. FIGS. 2, 3A, and 4 respectively illustrate a perspective cut away view of the scintillator array 124, the scintillator array 124 with an installed adhesive laminate 144, and the detector 120, including the scintillator array 124, the adhesive laminate 144, and the photosensor array 140.

Initially referring to FIG. 2, the scintillator array 124 includes a first major surface 204 that receives radiation and a second major surface 208 through which light indicative of the radiation is conveyed. As shown, adjacent scintillator pixels 132 are separated from each other via separators 212. The separators 212 may include a material such as a light reflective material that facilitates optically separating or isolating the scintillator pixels 132 from each other and improving light detection efficiency by the dixels 136 of the photosensor array 140. A light absorbing material may alternatively be used to optically separate or isolate the scintillator pixels 132 from each other. In the illustrated example, each pixel has a width and length of about one (1) to two (2) millimeters (mm), and each separator 212 has a width of about one hundred (100) microns to about three hundred (300) microns. In other embodiments, the pixels and the separators 212 may be thicker or thinner.

As noted above, the light emitting surface 208 of the scintillator array 124 may include non-uniformities and irregularities. Thus, in the illustrated embodiment, the surface 208 is curved in that it slopes downward from a region 216 between two scintillator pixels 132 in directions outward from the region 216 along the row 128 and, thus, the surface 208 is not flat. It is to be understood that the illustrated curvature in the surface 208 is shown for explanatory purposes and that the surface 208 may have different or additional non-uniformities and irregularities.

Turning to FIG. 3A, the cut away portion of the x-ray scintillator array 124 is shown coupled with the pressure sensitive adhesive laminate 144. In this example, the adhesive laminate 144 is about one hundred and twenty-five (125) microns thick. In other embodiments, the adhesive laminate 144 may be thicker or thinner. The adhesive laminate 144 includes first and second pressure sensitive adhesive sides 220 and 224 for respectively adhering to the scintillator array 124 and the photosensor array 140. As shown, the first pressure sensitive adhesive side 220 is physically coupled to the second surface 208 of the scintillator array 124.

As illustrated, the material free regions 228 are selectively positioned with respect to the separators 212. In this embodiment, a width of a material free region 228 conforms to a width of a separator 212. By way of example, assuming each separator 212 has a width of about two hundred (200) microns, each illustrated material free region 228 has a width of about two hundred (200) microns that is approximately centered about the separator 212 width. In other embodiments, the width of the material free regions may be greater or less than the width of the separators 212.

In this example, the material free regions 228 are formed between all adjacent pixels 132, resulting in a set of material free regions 228 that continuously extend between the rows and columns of scintillator dixels 132. However, it is to be appreciated that the material free regions 228 may be alternatively configured. For instance, FIG. 3B provides an example in which the material free regions 228 are formed in the adhesive laminate 144 between groups of four (4) dixels 132. FIG. 3C provides another example in which the material free regions 228 only run between rows of scintillator pixels 132. FIG. 3D provides another example in which individual material free regions 228 separated from each other via adhesive laminate 144 are formed between adjacent dixels 132. Other material free region configurations are also contemplated.

The material free regions 228 increase the flexibility or pliability of the adhesive laminate 144 in a lateral direction. In one instance, this allows the adhesive laminate 144 to expand or deform laterally into the material free regions 228 so that the adhesive laminate 144 conforms to any irregularities and non-uniformities of the surface of the scintillator 124, such as the curvature in the surface 208. The material free regions 228 also reduce optical cross-talk between scintillator pixels 132 that results from light traversing through the body of the adhesive laminate 144 to neighboring dixels 136 instead of to the corresponding dixels 136.

A suitable non-limiting adhesive laminate includes an optically clear, optically conductive, and light transmissive acrylic with opposing pressure sensitive adhesive surfaces. Such an adhesive laminate may include optical properties such as a refractive index of about 1.47, visible light transmission of about ninety-eight percent (98) or greater and/or clarity of about ninety-eight percent (98) or greater. A non-limiting example of such an adhesive laminate includes ARclear® 8154, which is a product of Adhesives Research, Inc. of Glen Rock, Pa., USA.

Turning now to FIG. 4, the scintillator array 124 is shown with the adhesive laminate 144 and the photosensor array 140 installed thereon. As described in greater detail below, the photosensor array 140 is installed in a manner so as to mitigate air pockets and gaps between the photosensor array 140 and the adhesive laminate and, hence, between the scintillator array 124 and the photosensor array 140. Note that in the illustrated example the adhesive laminate 144 variously protrudes into the material free regions 228 to compensate for the curvature of the surface 208.

Optionally, a filler material 232 is applied in the material free regions 228 after the scintillator array 124 and the photosensor array 140 are attached to the adhesive laminate 144 to help further reduce optical cross-talk between pixels 132. In this embodiment, the filler material 232 includes a flexible compound having carbon black, black paint, or other light absorbing material and an epoxy. Alternatively, the filler material may include an opaque reflector. A non-limiting suitable opaque reflector includes a compound of 25-50% Titanium Dioxide ($TiO_2$) and an epoxy such as Epo-tek 301, which is a two component optically clear epoxy adhesive provided by Epoxy Technology, Inc. of Billerica Mass., USA.

FIG. 5 describes a method for optically coupling the scintillator array 124 with the photosensor array 140 via the adhesive laminate 144. At reference numeral 504, the adhesive laminate 144 is installed on the surface 208 of the scintillator array 124. It is to be appreciated that the adhesive laminate 144 may be obtained as a double sided adhesive laminate sheet disposed between removable polyester carrier liners that generally maintain the integrity of the first and second adhesive surfaces 220 and 224. In such instance, the liner that is removably attached to the side of the adhesive laminate 144 being installed on the scintillator array 124 is removed so that the adhesive laminate 144 can be installed on the surface 208. The adhesive laminate 144 may be alternatively be provided, for example, as a roll of double sided adhesive laminate or otherwise.

Pressure is selectively applied to the adhesive laminate 144 towards the scintillator 124 during installation to conform and adhere the adhesive laminate 144 to the surface 208 of the scintillator 124, including any non-uniformities and irregularities in the surface 208. For instance, the surface 208 is shown herein as having a generally convex shaped curve. As such, such pressure may begin about a region corresponding to the region 216 and move outwardly in opposing directions along the curvature. In this manner, air can be expelled as the laminate 144 is installed. If the surface 208 were instead generally concave shaped, the pressure may alternatively begin near a first outer end of the curved surface and move across the surface 208 towards a second opposing outer end. Other techniques can be used for convex and concave shaped surfaces as well as other shaped surfaces.

At 508, the material free regions 228 are formed in the adhesive laminate 144. In one instance, hot wire forming employing a suitably dimensioned wire heated via an electrical current or otherwise is used to form the material free regions 228. Using such a technique, a first set of material free regions that are generally parallel in a first direction is formed first. Then, a second set of generally parallel material free regions, which are generally orthogonal to the first set of parallel material free regions, are formed. Alternatively, the first and second material free regions are concurrently formed. Other suitable techniques for forming the material free regions 228 include laser ablation, scribing, and the like. The material free regions have two disparate functions. Firstly, the material free regions 228 allow the adhesive laminate 144 to deform into the material free regions 228 so that the adhesive laminate 144 conforms to surface irregularities and non-uniformities and to expel air trapped between the adhesive laminate 144 and the scintillator 124. Secondly, the material free regions 228 prevent optical contact between the laminate covering adjacent dixels 136 and reduce cross-talk through the laminate.

At 512, the photosensor array 140 is installed on the adhesive laminate 144. As with the adhesive laminate 144, pressure may be selectively applied to the photosensor array 140 in a direction towards the scintillator array 124 to facilitate adhering the surface 228 of the adhesive laminate 144 to the photosensor array 140, including deforming or otherwise shaping the adhesive laminate 144 to conform to non-uniformities and irregularities in the surface and expelling air lying between the adhesive laminate 144 and the photosensor array 140.

At 516, the filler material 232 is applied in the material free regions 228, if desired. Various techniques can be used to apply the material 232 including capillary underfilling, screen printing, painting, and brushing, as well as other techniques.

It is to be appreciated that using the adhesive laminate 144 may reduce cost, production time, and manufacturing steps relative to non-laminate adhesives that require other pre and post installation steps such as mixing, de-aeration, dispensing, curing, and/or cleaning.

Variations are now described.

In the method described above, the adhesive laminate 144 is first installed on the x-ray scintillator 124 and then the photosensor array 140 is installed on the adhesive laminate 144. However, it is to be appreciated that the adhesive laminate 144 may alternatively be installed on the photosensor array 140 first and then subsequently the scintillator 124 can be installed on the adhesive laminate 144.

In another embodiment, the material free regions 228 are formed prior to installing the adhesive laminate 144. In one instance, this may be accomplished by removing a carrier liner from a sheet of adhesive laminate 144 and forming the material free regions 228 in the adhesive laminate 144 as described herein. Alternatively, the material free regions 228 are formed in the adhesive laminate 144 without first removing the liner.

For the configuration shown in FIG. 3D above, a die or the like can be used to pre-form the individual material free regions 228 in the sheet, with or without a liner removed, to generate a perforated adhesive laminate. The adhesive laminate can then be registered with and installed on the x-ray scintillator array 124 (or the photosensor array 140). Then, the photosensor array 140 (or the x-ray scintillator array 124) can be installed on the pre-slotted adhesive laminate 144.

The material free regions 228 can be variously shaped. For example, they may be elliptical, circular, triangular, or otherwise shaped.

As described above, the material free regions 228 may be filled with the filler material 232 after the x-ray scintillator array 124 and the photosensor array 140 are optically coupled via the adhesive laminate 144. In an alternative embodiment, the material free regions 228 are filled with the material 323 after they are formed, but before the adhesive laminate 144 is adhered to x-ray scintillator array 124 or the photosensor array 140.

In another embodiment, the filler material 232 is omitted.

Applications of the forgoing and variations thereof include, but are not limited to, Computed Tomography (CT) as well as other medical and non-medical applications such as PET, x-ray, gamma ray, etc. applications using a radiation-sensitive detector to detect radiation and produce a signal indicative thereof.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A radiation-sensitive detector, comprising:
   a scintillator array;
   a photosensor array having plurality of dixels; and an adhesive laminate sheet disposed between and physically coupling the scintillator array and the photosensor array, wherein the adhesive laminate is light transmissive acrylic, wherein the adhesive laminate sheet retains sheet form while including at least one material free region within the adhesive laminate from the scintillator array to the photosensor array.

2. The detector of claim 1, wherein the material free region comprises at least one of an elliptical, circular and triangular shape.

3. The detector of claim 1, wherein the adhesive laminate is optically clear and optically conductive and includes opposing pressure sensitive adhesive surfaces.

4. The detector of claim 3, wherein the adhesive laminate is not an optical liquid epoxy that is cured after being applied to the one of the scintillator array or the photosensor array.

5. The detector of claim 1, wherein the adhesive laminate is not a cured liquid glue.

6. The detector of claim 1, wherein the adhesive laminate is a preformed double sided adhesive sheet.

7. The detector of claim 1, wherein a width of the material free region is about equal to or less than a width of a separator, which has a width of about two hundred microns.

8. The detector of claim 1, wherein the adhesive laminate is laterally deformable.

9. The detector of claim 1, wherein the adhesive laminate is a pressure sensitive optical adhesive laminate.

10. The detector of claim 1, wherein the adhesive laminate has a refractive index of about 1.47, visible light transmission of about ninety-eight percent or greater and clarity of about ninety-eight percent or greater.

11. The detector of claim 1, further including an imaging apparatus including the detector.

12. A radiation-sensitive detector, having a photosensor array coupled, via an adhesive laminate sheet, to a scintillator array, formed by the steps of:

forming one or more material free regions through the adhesive laminate sheet, wherein the adhesive laminate sheet surrounds the one or more material free regions;

attaching a first adhesive surface of the adhesive laminate sheet to one of the photosensor array or the scintillator array; and attaching a second adhesive surface of the adhesive laminate sheet to the other one of the photosensor array or the scintillator array, wherein the adhesive laminate sheet is disposed between and optically couples the photosensor array and the scintillator array.

13. The detector of claim 12, further including preforming the one or more material free regions using a die before attaching the adhesive laminate sheet to the photosensor array and the scintillator array.

14. The detector of claim 12, further including forming the one or more material free regions using at least one of a hot wire or laser ablation after attaching the adhesive laminate sheet to at least one of the photosensor array or the scintillator array.

15. The detector of claim 12, wherein the adhesive laminate sheet includes an optically clear, optically conductive, and light transmissive acrylic with opposing pressure sensitive adhesive surfaces.

16. The detector of claim 12, further including filling the one or more material free regions with a filler material after the adhesive laminate is attached to both the photosensor array and the scintillator array.

17. The detector of claim 16, wherein the filler material is a material that absorbs light or material that reflects light.

18. A method, comprising:

preforming at least one material free region in an adhesive laminate sheet using a die;

attaching, after preforming the at least one material free region in the adhesive laminate sheet, the adhesive laminate sheet to one of a photosensor array having at least one photoelement or a scintillator array; and attaching, after preforming the at least one material free region in the adhesive laminate sheet, the adhesive laminate to the other one of the photosensor array or the scintillator array.

19. The method of claim 18, further including applying force when attaching the adhesive laminate sheet to the photosensor array and the scintillator array, wherein the adhesive laminate sheet is a pressure sensitive adhesive laminate.

20. The method of claim 18, wherein the adhesive laminate sheet includes an optically clear, optically conductive, and light transmissive acrylic with opposing pressure sensitive adhesive surfaces.

21. The method of claim 18, further including forming a plurality of material free region that extend between rows and columns of the dixels.

22. The method of claim 18, further including filling the material free region with a filler after the adhesive laminate is attached to both the photosensor array and the scintillator array via capillary underfilling.

23. The detector of claim 12, wherein the adhesive laminate sheet retains sheet form while surrounding at least the portion of the one or more material free regions.

24. The method of claim 18, wherein the adhesive laminate sheet retains sheet form while including the at least one material free region.

25. The method of claim 24, wherein the at least one material free region
comprises at least one of an elliptical, circular and triangular shape.

* * * * *